(12) United States Patent
Hong et al.

(10) Patent No.: US 12,261,867 B2
(45) Date of Patent: Mar. 25, 2025

(54) METHOD AND SYSTEM FOR ESTIMATING THE TIME OF OCCURRENCE OF A SECURITY EVENT

(71) Applicant: FESCARO Co., Ltd., Suwon-si (KR)

(72) Inventors: Seok Min Hong, Hanam-si (KR); Hyun Jung Lee, Namyangju-si (KR)

(73) Assignee: FESCARO Co., Ltd., Suwon-si (KR)

( * ) Notice: Subject to any disclaimer, the term of this patent is extended or adjusted under 35 U.S.C. 154(b) by 262 days.

(21) Appl. No.: 17/968,043

(22) Filed: Oct. 18, 2022

(65) Prior Publication Data
US 2023/0121819 A1    Apr. 20, 2023

(30) Foreign Application Priority Data
Oct. 18, 2021    (KR) .................. 10-2021-0138697

(51) Int. Cl.
*G06F 21/00*    (2013.01)
*H04L 9/40*    (2022.01)

(52) U.S. Cl.
CPC ...... *H04L 63/1425* (2013.01); *H04L 63/1416* (2013.01)

(58) Field of Classification Search
CPC . H04L 63/1425; H04L 63/1416; H04L 67/12; H04L 43/067; H04L 12/40104; H04L 12/4013; H04L 12/66; H04L 43/106; H04L 2012/40273
See application file for complete search history.

(56) References Cited

U.S. PATENT DOCUMENTS

| | | | |
|---|---|---|---|
| 2018/0013771 A1* | 1/2018 | Crabtree | H04L 63/1416 |
| 2023/0123241 A1* | 4/2023 | Pan | H04W 12/069 |
| | | | 713/168 |

FOREIGN PATENT DOCUMENTS

| | | | |
|---|---|---|---|
| CN | 20210042863 | * | 4/2021 |
| KR | 20170058140 A | | 5/2017 |
| KR | 20210003261 | * | 1/2021 |

* cited by examiner

*Primary Examiner* — Ghazal B Shehni
(74) *Attorney, Agent, or Firm* — NKL LAW; Jae Youn Kim

(57) ABSTRACT

Provided are a method and system for estimating a time of occurrence of a security event. The method includes: transmitting an actual time to a gateway of a vehicle; obtaining, from the gateway, time history data storing an actual time flag data element; obtaining, from the gateway, logging data prepared during security event detection; and estimating a time of occurrence of a security event, based on the logging data and the time history data, wherein the time history data and the logging data are prepared based on a vehicle reference time including a timestamp value and reset counter value of the vehicle.

6 Claims, 8 Drawing Sheets

1(SeqNum), R(Reset Flag) — 140-1
2(SeqNum), T(Trust Time Sync Flag), TimeStamp, ResetCnt, CurrentTime — 140-2
3(SeqNum), T(Trust Time Sync Flag), TimeStamp, ResetCnt, CurrentTime
4(SeqNum), T(Trust Time Sync Flag), TimeStamp, ResetCnt, CurrentTime
5(SeqNum), R(Reset Flag)
6(SeqNum), T(Trust Time Sync Flag), TimeStamp, ResetCnt, CurrentTime
7(SeqNum), M(Milestone Flag), TimeStamp — 140-3
8(SeqNum), M(Milestone Flag), TimeStamp
9(SeqNum), M(Milestone Flag), TimeStamp
10(SeqNum), T(Trust Time Sync Flag), TimeStamp, ResetCnt, CurrentTime
11(SeqNum), T(Trust Time Sync Flag), TimeStamp, ResetCnt, CurrentTime
12(SeqNum), T(Trust Time Sync Flag), TimeStamp, ResetCnt, CurrentTime
13(SeqNum), T(Trust Time Sync Flag), TimeStamp, ResetCnt, CurrentTime
14(SeqNum), M(Milestone Flag), TimeStamp

FIG. 4

METHOD AND SYSTEM FOR ESTIMATING THE TIME OF OCCURRENCE OF A SECURITY EVENT

CROSS-REFERENCE TO RELATED APPLICATION

This application is based on and claims priority under 35 U.S.C. § 119 to Korean Patent Application No. 10-2022-0138697, filed on Oct. 18, 2021, in the Korean Intellectual Property Office, the disclosure of which is incorporated by reference herein in its entirety.

BACKGROUND

1. Field

The disclosure relates to a method and system for estimating a time of occurrence of a security event.

2. Description of the Related Art

With the growth of a connected car market in which a vehicle is connected to a communication network, a security threat aiming at a connected car, such as hacking through a network or a physical security breach, is increasing.

In response to a rapid increase in a threat of a cyber attack related to a connected car, many companies and research institutions are developing connected car security solutions. In addition, national organizations worldwide and international organizations are preparing various policies to build safe connected car environments. In particular, some advanced countries where a connected car market is rapidly growing have quickly recognized seriousness of connected car security, and are proposing security guidelines containing details about the connected car security together with countermeasures. As an example of the security guidelines, a regulation has been established, in which data is logged to support cyber attack detection, and data forensic capability capable of successfully analyzing a cyber attack or attempt is requested to be provided.

The aforementioned background technology is technical information possessed by the inventor for derivation of the disclosure or acquired by the inventor during the derivation of the disclosure, and is not necessarily prior art disclosed to the public before the application of the disclosure.

SUMMARY

Provided are a method and system for estimating a time of occurrence of a security event.

Additional aspects will be set forth in part in the description which follows and, in part, will be apparent from the description, or may be learned by practice of the presented embodiments.

According to an aspect of an embodiment, a method of estimating a time of occurrence of a security event, includes: transmitting an actual time to a gateway of a vehicle; obtaining, from the gateway, time history data storing an actual time flag data element; obtaining, from the gateway, logging data prepared during security event detection; and estimating a time of occurrence of a security event, based on the logging data and the time history data, wherein the time history data and the logging data are prepared based on a vehicle reference time including a timestamp value and reset counter value of the vehicle.

The timestamp value may be generated by a clock that is operated by constant power supply of the vehicle.

The gateway may identify a clock state of the vehicle during booting, and when the clock state of the vehicle is a disabled state, write a data element of a reset flag type on the time history data and then change the clock to an enabled state.

The gateway may identify the clock state of the vehicle during the booting, and when the clock state of the vehicle is an enabled state, write a milestone flag data element on the time history data when a difference between a current timestamp value and a most recent timestamp value of the time history data exceeds a pre-set milestone time value.

The estimating of the time of the occurrence of the security event may include, when a reset counter value of the actual time flag data element of the time history data and a reset counter value of the logging data are different from each other, estimating the time of the occurrence of the security event, based on the milestone time value.

According to an aspect of another embodiment, a system for estimating a time of occurrence of a security event, includes: a security gateway configured to determine a vehicle reference time including a timestamp value and reset counter value of a vehicle, and preparing time history data and logging data based on the vehicle reference time; and a server configured to transmit an actual time to the security gateway, obtain, from the security gateway, the time history data storing an actual time flag data element based on the actual time, obtain, from the security gateway, the logging data prepared during security event detection, and estimate a time of occurrence of a security event, based on the logging data and the time history data.

According to an aspect of another embodiment, a computer-readable recording medium has recorded thereon a program for executing the method on a computer.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 illustrates time history data according to an embodiment;

DETAILED DESCRIPTION

Figure 1:
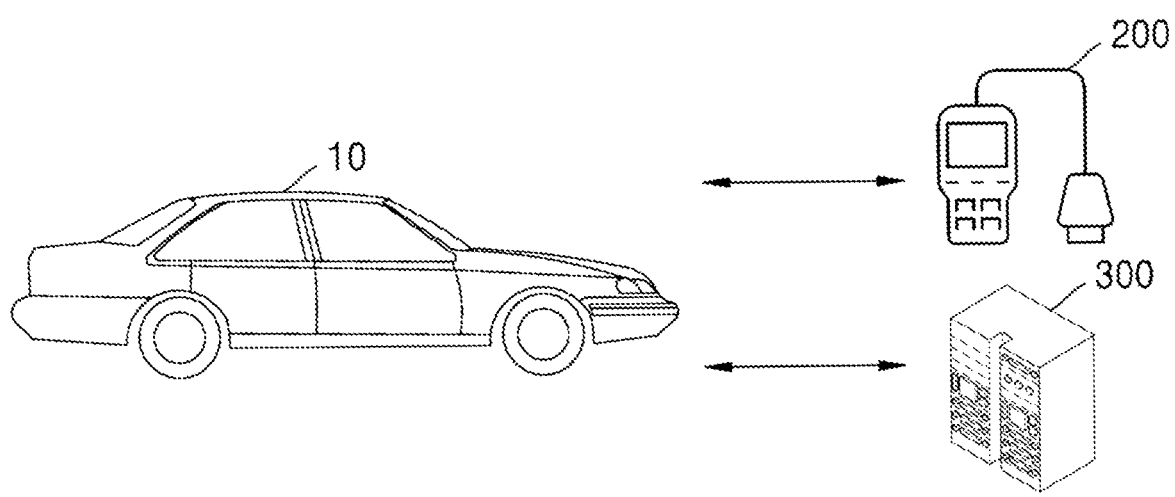
FIG. 1 is a diagram of a system including a vehicle and an apparatus outside the vehicle, according to an embodiment.

Advantages and features of the disclosure and methods of accomplishing the same may be understood more readily by reference to the following detailed description of the embodiments and the accompanying drawings. However, it should be understood that the disclosure is not limited to embodiments presented below, but may be implemented in various different forms, and includes all modifications, equivalents, or substitutes within the ideas and technical scope of the disclosure.

As used herein, the term "and/or" includes any and all combinations of one or more of the associated listed items. Expressions such as "at least one of," when preceding a list of elements, modify the entire list of elements and do not modify the individual elements of the list.

The terms used in the present specification are only used to describe specific embodiments, and are not intended to limit the disclosure. An expression used in the singular encompasses the expression in the plural, unless it has a clearly different meaning in the context. In the present specification, it is to be understood that terms such as "including" or "having", etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Some embodiments of the disclosure may be represented by functional block configurations and various processing operations. Some or all of these functional blocks may be implemented by various numbers of hardware and/or software configurations that perform particular functions. For example, the functional blocks of the disclosure may be implemented by one or more microprocessors or by circuit configurations for a certain function. Also, for example, the functional blocks of the disclosure may be implemented in various programming or scripting languages. The functional blocks may be implemented by algorithms executed in one or more processors. Also, in the disclosure, the related art may be employed for electronic environment setting, signal processing, and/or data processing. The terms such as "mechanism", "element", "means", and "configuration" may be broadly used and should not be limited as mechanical and physical components.

In addition, a connection line or a connection member between components shown in drawings is merely a functional connection and/or a physical or circuit connection. In an actual device, connections between components may be represented by various functional connections, physical connections, or circuit connections that are replaceable or added.

Hereinafter, an operation performed by a user may denote an operation performed by the user through a user terminal. For example, a command corresponding to the operation performed by the user may be input to the user terminal through an input device (for example, a keyboard or a mouse) additionally connected to or embedded in the user terminal. As another example, the command corresponding to the operation performed by the user may be input to the user terminal through a touch screen of the user terminal. Here, the operation performed by the user may include a certain gesture. For example, the gesture may include tap, touch and hold, double tap, drag, panning, flick, and drag and drop.

Hereinafter, the disclosure will be described in detail with reference to accompanying drawings.

FIG. 1 is a diagram of a system including a vehicle 10 and an apparatus outside the vehicle 10, according to an embodiment.

The system according to an embodiment may include the vehicle 10, and one or more of a diagnosis apparatus 200 and a diagnosis server 300 outside the vehicle 10.

The vehicle 10 of the disclosure is a means of transportation that moves by moving wheels using artificial power. The disclosure does not limit the type and shape of the vehicle 10, and any means of transportation capable of implementing a method of the disclosure of estimating a time of a security event may be the vehicle 10 of the disclosure. The vehicle 10 may be a connected car capable of communicating with the outside, but a non-connected car may also be the vehicle 10 of the disclosure.

According to an embodiment of the disclosure, the vehicle 10 manages a vehicle reference time, prepares logging data during security event detection, and prepares time history data based on the vehicle reference time and an actual time obtained from the outside. An internal configuration and operations of the vehicle 10 will be described in detail below.

The diagnosis apparatus 200 may provide the actual time to the vehicle 10, obtain the logging data and the time history data from the vehicle 10, and estimate a time of occurrence of a security event. According to an embodiment, the diagnosis apparatus 200 may be on-board diagnostics (OBD) connected to an OBD port of the vehicle 10. In the embodiment of FIG. 1, the diagnosis apparatus 200 is illustrated in a form of OBD for convenience, but any apparatus capable of estimating a time of occurrence of a security event by being connected to the vehicle 10 may be the diagnosis apparatus 200, in addition to a general OBD.

The diagnosis server 300 may be a server that performs a same function as the diagnosis apparatus 200 and may be connected to the vehicle 10 via wires or wirelessly. In other words, the diagnosis server 300 may provide the actual time by being connected to the vehicle 10 through a network, even if the diagnosis server 300 is not physically connected to the OBD port, and estimate the time of occurrence of the security event by obtaining the logging data and the time history data. In the specification below, for convenience of descriptions, even when only the diagnosis apparatus 200 is described, it would be understood that the corresponding configuration includes the concept of the diagnosis server 300.

The network connecting the diagnosis server 300 and the vehicle 10 includes a local area network (LAN), a wide area network (WAN), a value-added network (VAN), a mobile radio communication network, a satellite communication network, or a combination thereof. The network is a data communication network having a broad meaning for enabling seamless communication between network entities shown in FIG. 1, and may include wired Internet, wireless Internet, or a mobile radio communication network. Examples of radio communication may include wireless LAN (Wi-Fi), Bluetooth, Bluetooth low energy (BLE), Zigbee, Wi-Fi direct (WFD), ultra wideband (UWB), infrared data association (IrDA), and near field communication (NFC), but are not limited thereto.

Hacking attacks applied to the vehicle 10 have become further diversified due to a convenience function of the vehicle 10 being connected to the outside. Recently, regulations for settling hacking and security-related issues of the vehicle 10 are being established, and as an example, in Europe, data is logged to support cyber attack detection during vehicle production, and data forensic capability capable of successfully analyzing a cyber attack or attempt is requested to be provided.

Among security-related regulations, a regulation that requests an analysis of a security event is different from an existing regulation in that a vehicle manufacturer is requested to be responsible even for an operation after the production. In other words, existing vehicle-related regulations pertain to quality or safety rules to be followed during production of vehicles, whereas the regulation that requests an analysis of a security event requests continuous firmware update for detecting and monitoring a hacking attack.

In this regard, it is necessary to collect and accurately analyze security data so as to detect and monitor a hacking attack. In addition, a digital forensic technology for preparing security data whenever an event occurs and analyzing the security data afterward is necessary so as to later analyze an approach that is not recognized as a cyber attack before but later recognized as an attack according to an update.

Thus, it is essential to determine a time point of occurrence of an event while storing the security data. However, a connectivity function of being connected to an external apparatus through a network is not an essential function for a vehicle. Accordingly, security data recorded in the vehicle is not recorded based on an actual time, but is recorded based on a clock inside the vehicle. Accordingly, there is a need for a method of estimating when a security event actually occurred by mapping the clock inside the vehicle and the actual time. Hereinafter, a method and system for estimating a time of occurrence of a security event of a vehicle, according to the disclosure, will be described in detail.

Figure 2:
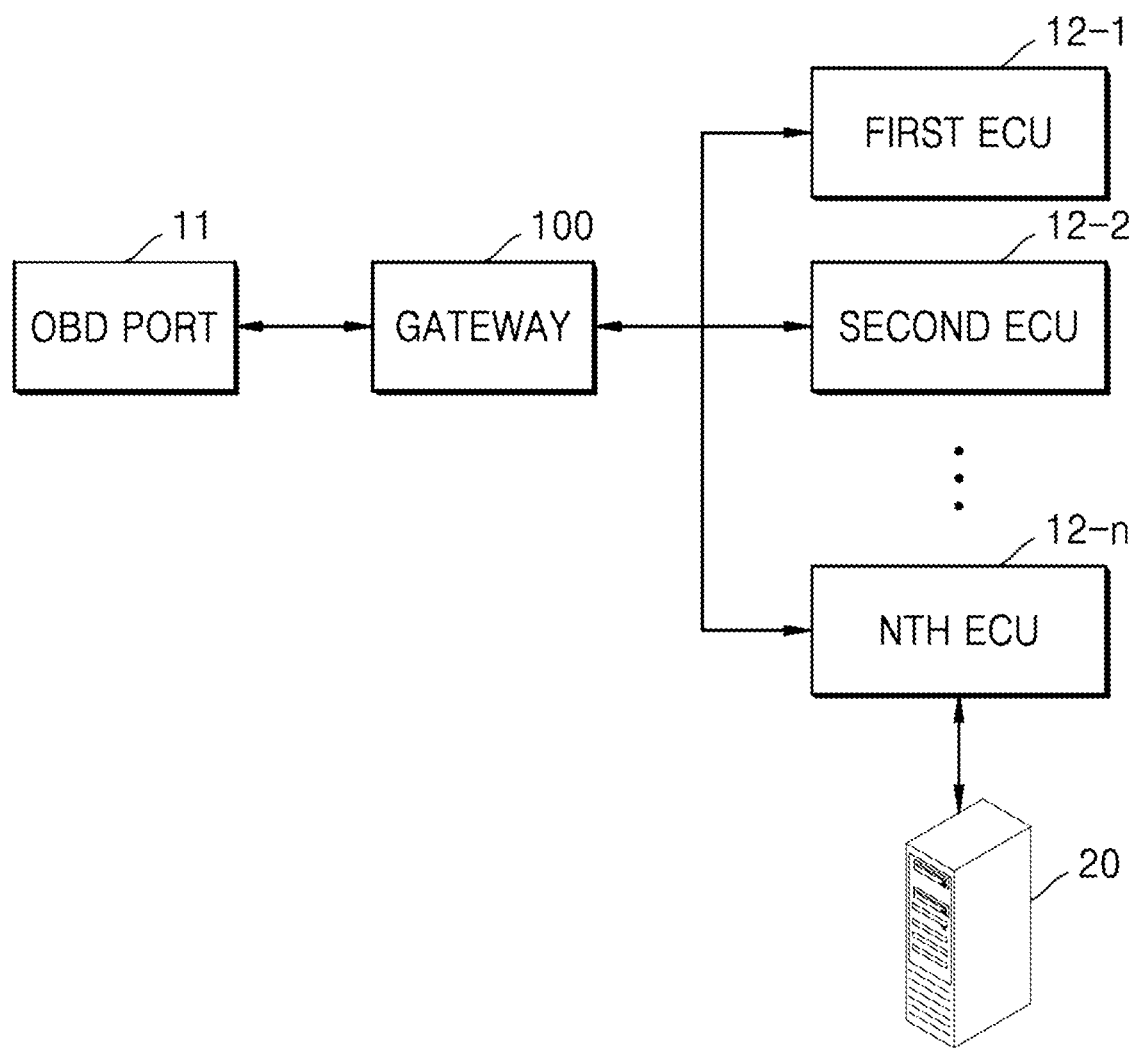
FIG. 2 is a diagram showing an internal configuration of a vehicle, according to an embodiment.

FIG. 2 is a diagram showing an internal configuration of a vehicle, according to an embodiment.

According to an embodiment of the disclosure, FIG. 2 illustrates a block diagram of an internal configuration of the vehicle 10 of FIG. 1. A plurality of first through nth engine control units (ECUs) 12-1 through 12-n are provided in the vehicle 10, and each of the first through nth ECUs 12-1 through 12-n may measure and control various components of the vehicle 10. For example, the first ECU 12-1 may variously control internal operations of an engine, for example, collect data related to the engine from a plurality of sensors, supply a suitable amount of fuel to the engine, and realize most efficient ignition timing and output.

As described above, each of the first through nth ECUs 12-1 through 12-n inside the vehicle 10 is a key controller that measures and controls various components inside the vehicle 10, and thus a time of occurrence of a security event may be estimated for each of the first through nth ECUs 12-1 through 12-n. Accordingly, a reliable reference time may be provided to each of the first through nth ECUs 12-1 through 12-n, and in this regard, each of the first through nth ECUs 12-1 through 12-n may obtain a reference time inside the vehicle 10 from a gateway 100 described below.

According to an embodiment of the disclosure, the gateway 100 may be a security gateway performing a method of the disclosure of estimating a time of occurrence of a security event by being connected to each of the first through nth ECUs 12-1 through 12-n and an OBD port 11. In detail, the gateway 100 may generate and provide the reliable reference time to all of the first through nth ECUs 12-1 through 12-n in the vehicle 10. To provide the reliable reference time, the gateway 100 may periodically provide a timestamp value and a reset counter value to all of the first through nth ECUs 12-1 through 12-n in the vehicle 10. Also, the gateway 100 may manage a vehicle reference time, prepare logging data during security event detection, and prepare time history data based on the vehicle reference time and an actual time obtained from the outside.

Here, the OBD port 11 is a 16-pin terminal to which the diagnosis apparatus 200 described in FIG. 1 may be connected, and an actual time transmitted from the diagnosis apparatus 200 may be transmitted to the gateway 100 through the OBD port 11. In addition, the nth ECU 12-n may be a communication control device communicating with an external connectivity server 20 via wires or wirelessly.

Figure 3:
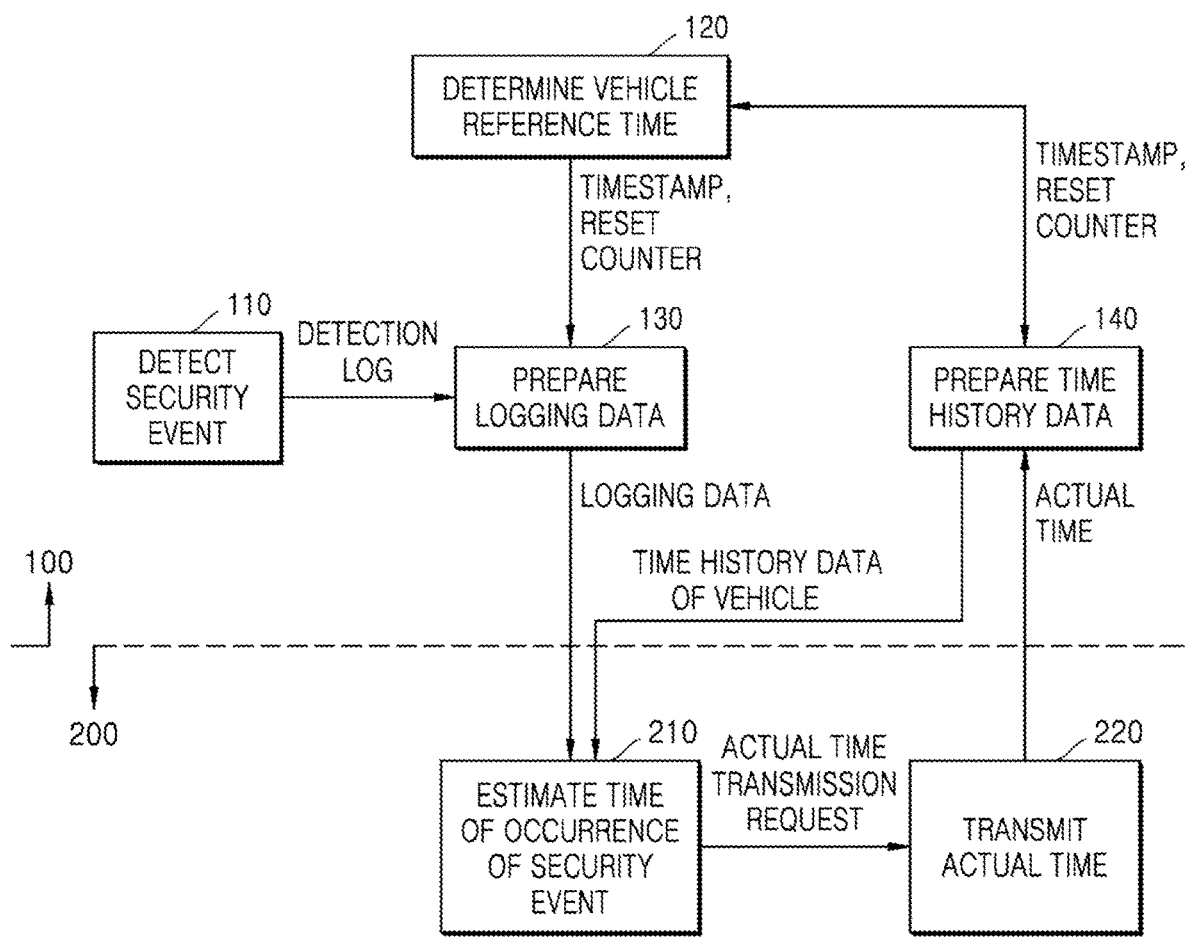
FIG. 3 is a block diagram for describing a method of estimating a time of occurrence of a security event inside and outside a vehicle, according to an embodiment.

FIG. 3 is a block diagram for describing a method of estimating a time of occurrence of a security event inside and outside a vehicle, according to an embodiment.

Referring to FIG. 3, the gateway 100 inside a vehicle, according to an embodiment of the disclosure, may detect a security event (operation 110), prepare logging data (operation 130), determine a vehicle reference time including a timestamp and a reset counter (operation 120), and prepare time history data based on the timestamp and the reset counter (operation 140).

In addition, the diagnosis apparatus 200 outside the vehicle, according to an embodiment of the disclosure, may transmit an actual time to the gateway 100 (operation 220), and estimate a time of occurrence of a security event by obtaining the logging data and the time history data from the gateway 100 (operation 210).

In detail, the gateway 100 may detect the security event (operation 110). The gateway 100 may be connected to ECUs of the vehicle as described above and monitor a state of the vehicle. The gateway 100 may monitor the state of the vehicle and generate a trigger when a security-related issue occurs. In addition, according to an embodiment of the disclosure, the security-related issue for which the gateway 100 generates the trigger may include not only an event pre-defined as a cyber attack, but also an event suspected to be a cyber attack.

The gateway 100 may prepare the logging data for the security event according to triggering of detecting the security event (operation 130). Here, the logging data may further include information on the timestamp and the reset counter.

The gateway 100 may determine information on the vehicle reference time (operation 120). The vehicle reference time determined by the gateway 100 may include the timestamp and the reset counter. Here, the timestamp is time information according to the internal standard of the vehicle, which is generated by a real time clock (hereinafter, referred to as a clock) inside the vehicle. An initial state of the clock inside the vehicle is a disabled state, and a separate restart command is required to change the timestamp to an enabled state. Also, the reset counter may be the number of times the clock is enabled by the restart command after the clock is disabled.

In this regard, after the clock is initially enabled when the vehicle is released, the gateway 100 may determine whether to remove a battery by obtaining the state of the clock in the vehicle for each booting (or each time the vehicle is started). In other words, to manage a reference time, the gateway 100 may obtain the state of the block during the booting, determine that the battery normally operates when the timestamp is in an enabled state, and determine that the battery has been removed and is reconnected when the timestamp is in a disabled state.

Also, the gateway 100 may prepare the time history data (operation 140). The time history data may be prepared based on the timestamp and the reset counter, and may include data elements having one of three types of flags. Each element of the time history data of the disclosure may include one of a reset flag, an actual time flag, and a milestone flag.

FIG. 4 illustrates time history data according to an embodiment.

In the embodiment of FIG. 4, each row may indicate a data element of the time history data. First, a reset flag data element 140-1 may include a serial number (SeqNum) and a reset flag (Reset Flag). The gateway 100 may detect disabling of a clock, and record, on the time history data, the reset flag data element 140-1 whenever there is a restart command of the clock.

An actual time flag data element 140-2 may include a serial number (SeqNum), an actual time flag (Trust Time Sync Flag), a timestamp (TimeStamp), a reset counter (ResetCnt) and an actual time (CurrentTime). The gateway 100 may generate the actual time flag data element 140-2 when a safe actual time is input from the external diagnosis apparatus 200. Here, the timestamp is recorded together with the actual time (for example, 28 Sep. 2021, 10:35:22 AM), and thus the clock inside a vehicle and the actual time may be mapped to each other. In other words, a relationship between a reference time inside the vehicle and the actual time may be determined by using the actual time flag data element 140-2. Meanwhile, an actual time flag may be prepared based on the actual time automatically transmitted when the diagnosis apparatus 200 is connected to the vehicle, but to prevent redundant storage, a request within a pre-set time (for example, 24 hours) may not be additionally stored.

A milestone flag data element 140-3 may include a serial number (SeqNum), a milestone flag (Milestone Flag), and a timestamp (TimeStamp). The gateway 100 may generate the milestone flag data element 140-3 when the clock is in an enabled state and a difference between a most recent timestamp value and a current timestamp value exceeds a pre-set milestone time value.

In other words, according to the disclosure, the timestamp may be recorded according to periods of a minimum milestone time value even when the clock normally operates, i.e., even when a battery is not removed and reconnected. According to an embodiment of the disclosure, the milestone time value may be 3 days (72 hours), but is not limited thereto. Referring to the embodiment of FIG. 4, it is determined that serial numbers 7, 8, and 9 are the milestone flag data elements 140-3. If the milestone time value is 3 days, it is determined that a data element of a serial number 7 is prepared after at least 72 hours a data element of a serial number 6 is prepared, and that the battery is not removed and reconnected for at least 72 hours.

Figure 5:
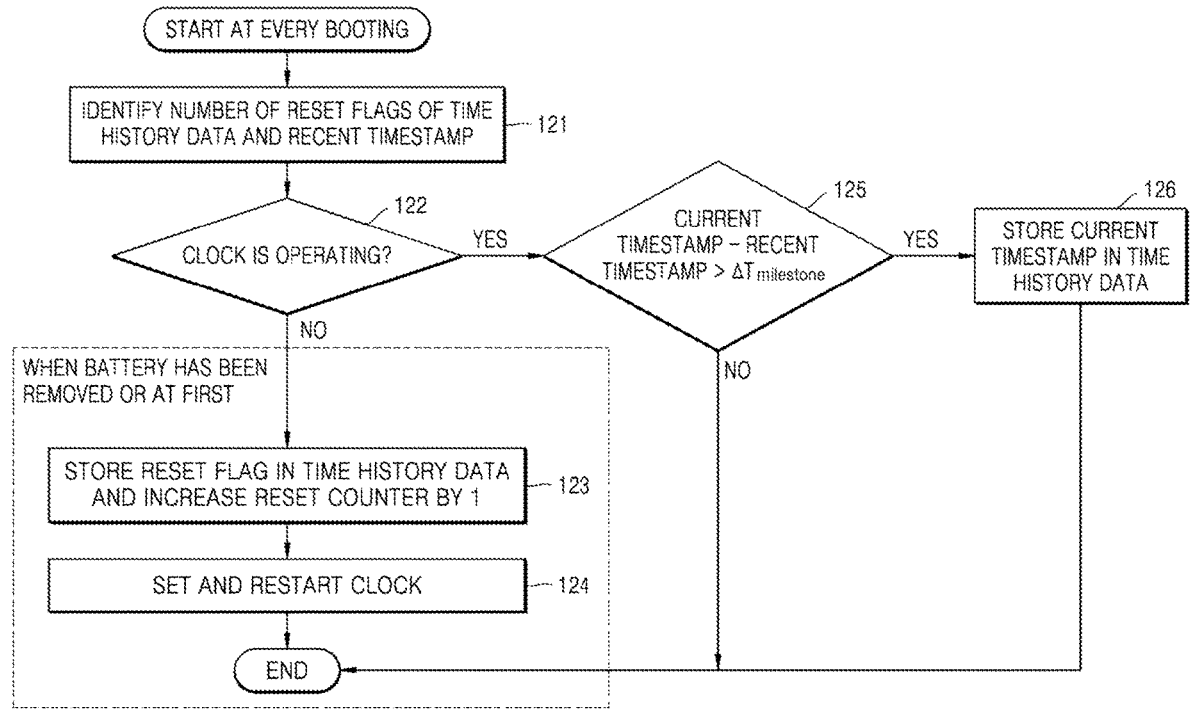
FIG. 5 illustrates, in time series, an operation method of a gateway, according to an embodiment.

FIG. 5 illustrates, in time series, an operation method of the gateway 100, according to an embodiment.

Referring to FIG. 5, first, the gateway 100 identifies the number of reset flags of time history data and a recent timestamp at every booting (or at every start) (operation 121). In other words, the gateway 100 identifies the total number of reset flags that are accumulated so far, and a timestamp of a data element prepared most recently. Referring to the embodiment of FIG. 4 together, the data element prepared most recently in the time history data may be a serial number 4. In this case, the gateway 100 identifies a timestamp and a reset counter value of the data element of the serial number 4.

Then, the gateway 100 may determine whether a clock is normally operating (operation 122), and when the clock is in a disabled state, may determine that a battery has been removed and reconnected. Accordingly, the gateway 100 may write a reset flag data element on the time history data and increase a reset counter by 1 (operation 123). Continuously, the gateway 100 may generate a reset flag data element as in a serial number 5. In addition, the reset counter value read in the serial number 4 is increased by 1. Lastly, the gateway 100 sets the clock to restart (operation 124).

When the clock is in an enabled state, the gateway 100 determines whether a difference between a current timestamp value and a most recent timestamp value exceeds a pre-set milestone time value ($\Delta T_{milestone}$) (operation 125). When the difference does not exceed the pre-set milestone time value, a separate value is not added to the time history data and the operation method ends. When the difference exceeds the pre-set milestone time value, a milestone flag data element may be added to the time history data (operation 126). Referring back to the embodiment of FIG. 4 again, when a data element recorded most recently is a serial number 6, the gateway 100 may compare a timestamp value of the serial number 6 with a current timestamp value, and generate the milestone flag data element 140-3 as in the serial number 7 when a difference thereof exceeds the milestone time value. In other words, according to an embodiment of the disclosure, even when the clock is continuously enabled, the timestamp value is periodically recorded, thereby accurately estimating a time of occurrence of a security event.

Referring back to FIG. 3, the diagnosis apparatus 200 outside the vehicle may transmit the actual time to the gateway 100 inside the vehicle (operation 220), and estimate the time of occurrence of the security event based on the logging data and the time history data on which the actual time is reflected (operation 210). As described above, an actual time data element of the time history data may be stored as a reference time timestamp of the vehicle and an actual time are mapped to each other. Accordingly, the diagnosis apparatus 200 may estimate the time of occurrence of the security event based on the time history data and the logging data of the security event.

Figure 6:
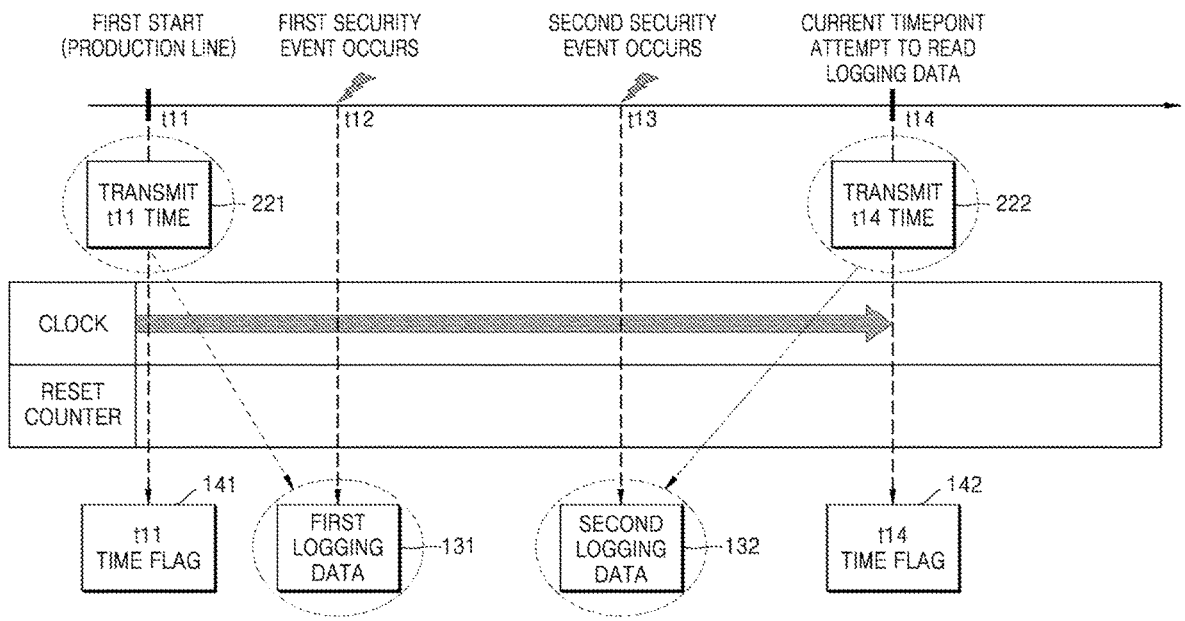
FIG. 6 is a diagram for describing a method of estimating a time of occurrence of a security event when there is no battery removal, according to an embodiment.

FIG. 6 is a diagram for describing a method of estimating a time of occurrence of a security event when there is no battery removal, according to an embodiment.

Referring to FIG. 6, it is assumed that a vehicle is released for a first time in a production line at a timepoint t11. Here, the gateway 100 stores, in time history data, an actual time flag data element including an actual time of the timepoint t11 by using an actual time transmitted from the diagnosis apparatus 200, a timestamp value, and a reset counter value (operation 141).

Then, when a first security event of the vehicle occurs at a timepoint t12, the gateway 100 is triggered and the first security event is stored as first logging data (operation 131). Here, the first logging data may include a timestamp value of the timepoint t12. Also, when a second security event occurs at a timepoint t13, the gateway 100 is triggered and the second security event is stored as second logging data (operation 132). Similarly, the second logging data may include a timestamp value of the timepoint t13.

Then, at a timepoint t14 (current timepoint), it is assumed that the diagnosis apparatus 200 may be connected to transmit an actual time of the timepoint t14 (operation 222), and logging data may be attempted to be read. Here, the gateway 100 stores, in the time history data, an actual time flag data element including the actual time of the timepoint t14 by using the actual time transmitted from the diagnosis apparatus 200, a timestamp value, and a reset counter value (operation 142).

The diagnosis apparatus 200 may compare the logging data and the time history data to obtain a time of occurrence of the first security event. In detail, the actual time of the timepoint t12 may be estimated by adding, to the actual time of the timepoint t11, a difference between timestamp values of the timepoint t11 and the timepoint t12. Alternatively, the actual time of the timepoint t12 may be estimated based on a difference between timestamp values of the timepoint t14 and the timepoint t12.

Similarly, the actual time of the timepoint t13 that is a time of occurrence of the second security event may be estimated by using a difference between timestamp values of the timepoint t11 and the timepoint t13 or a difference between timestamp values of the timepoint t13 and the timepoint t14.

Figure 7:
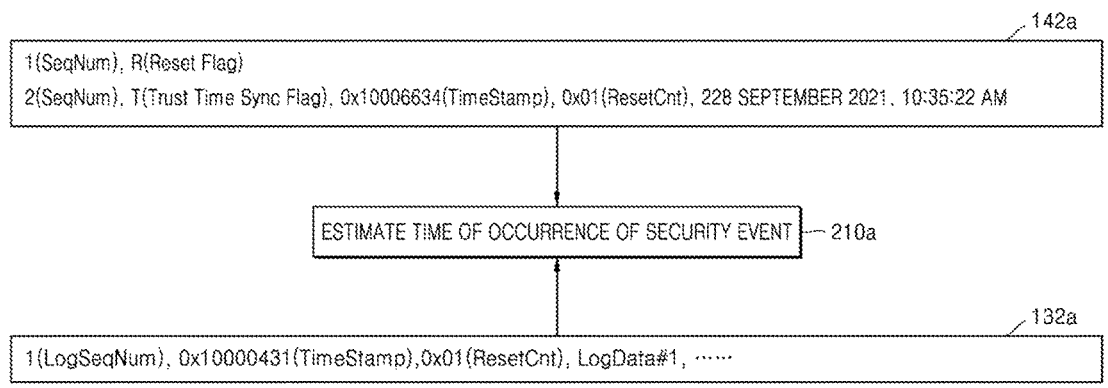
FIG. 7 illustrates an example of estimating a time of occurrence of a security event, according to an embodiment.

FIG. 7 illustrates an example of estimating a time of occurrence of a security event, according to an embodiment;

Referring to FIG. 7, an actual time flag is stored in a data element of a serial number 2 for time history data 142a, and at this time, an actual time is 28 Sep. 2021, 10:35:22 AM, a timestamp value in a vehicle is 0x10006634, and a reset counter is 0x01. Also, referring to logging data 132a, a timestamp value is 0x10000431 and a reset counter is 0x01 for logging data of a serial number 1.

In this case, a difference between the timestamp values of the time history data 142a and the logging data 132a is 0x6203, a decimal number thereof is 25091, and units is 1 second, and thus it is determined that the logging data 132a is faster by 25091 seconds (6 hours 58 minutes 11 seconds). Accordingly, it may be estimated that 28 Sep. 2021, 03:37:11 AM, which is 6 hours 58 minutes 11 seconds before 28 Sep. 2021, 10:35:22 AM when the actual time is transmitted, is the time of occurrence of the security event (operation 210a).

In addition, according to an embodiment of the disclosure, an estimation method may vary depending on whether battery removal has occurred, when the diagnosis apparatus 200 estimates the time of occurrence of the security event. When the battery removal has occurred, it is difficult to estimate the time of occurrence of the security event through simple matching with the actual time because an internal clock of a vehicle is disabled. Accordingly, it is unable to estimate a time of occurrence of a security event by simply adding or subtracting a difference of timestamp values, when a reset counter value of an actual time flag data element of time history data to be referred to is different from a reset counter value of logging data. Thus, according to an embodiment of the disclosure, even when the clock is in an enabled state, the gateway 100 may periodically record a milestone flag data element on the time history data, and highly accurately estimate the time of occurrence of the security event despite of the battery removal.

Hereinafter, a method of estimating a time of occurrence of a security event when battery removal has occurred will be described.

Figure 8:
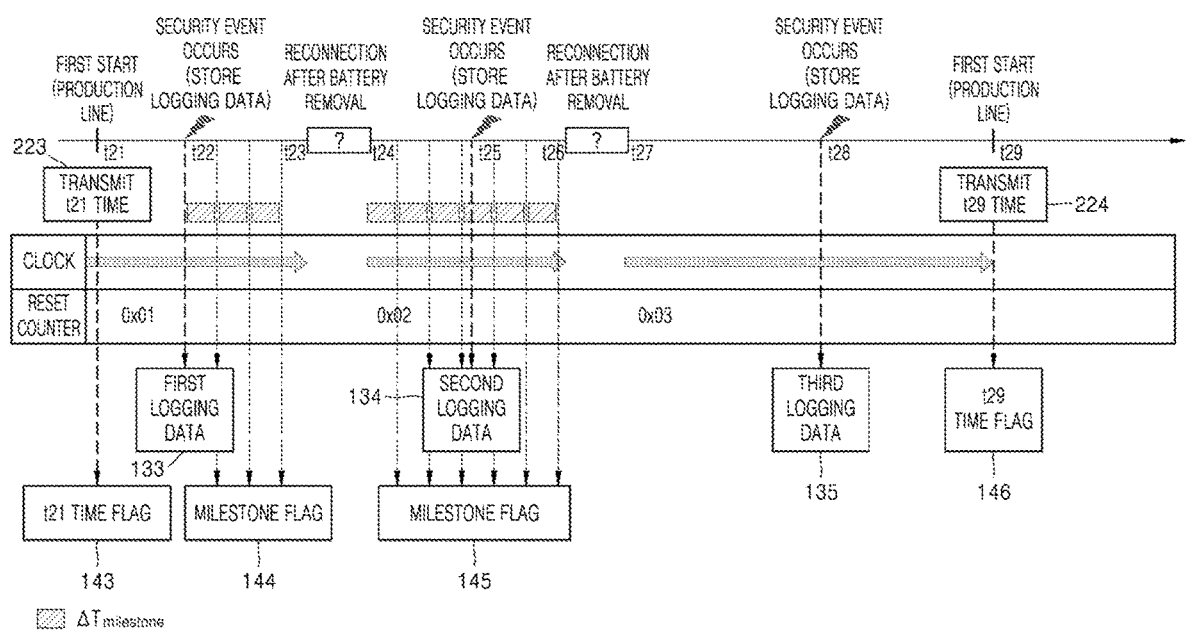
FIG. 8 is a diagram for describing a method of estimating a time of occurrence of a security event when battery removal has occurred, according to an embodiment.

FIG. 8 is a diagram for describing a method of estimating a time of occurrence of a security event when battery removal has occurred, according to an embodiment.

Referring to FIG. 8, it is assumed that a vehicle is first released in a production line at a timepoint t21, a security event occurs at a timepoint t22, a battery is removed and reconnected during timepoints t23 and t24, a security event occurs at a timepoint t25, the battery is removed and reconnected again during timepoints t26 and t27, a security event occurs at a timepoint t28, and logging data is attempted to be read at a timepoint t29.

In the embodiment of FIG. 8, an actual time is transmitted from outside the vehicle at the timepoint t21 and the timepoint t29 (operations 223 and 224), and the gateway 100 stores data elements of actual time flags 143 and 146 in time history data. In addition, at the timepoints t22, t25, and t28, pieces of first through third logging data 133, 134, and 135 are generated as the gateway 100 is triggered.

In detail, a reset counter (0x01) of the first logging data 133 and a reset counter (0x01) of the actual time flag 143 at the timepoint t21 have a same value, and thus an actual time of the timepoint t22 may be estimated by adding, to an actual time of the timepoint t21, a difference between a timestamp value of the first logging data 133 and a timestamp value of the actual time flag 143 at the timepoint t21. Similarly, a reset counter (0x03) of the third logging data 135 and a reset counter (0x03) of the actual time flag 146 at the timepoint t29 have a same value, and thus an actual time of the timepoint t28 may be estimated by subtracting, from an actual time of the timepoint t29, a difference between a timestamp value of the third logging data 135 and a timestamp value of the actual time flag 146 at the timepoint t29.

However, in case of the security event occurred at the timepoint t25, it is not possible to estimate an actual time by simply subtracting or adding a difference between timestamp values from or to a comparative timepoint, because a clock is disabled due to reconnection after battery removal. This is because the clock has been disabled due to the battery removal between the timepoints t21 and t29, which may be comparative targets as the actual times thereof are known, and the timepoint t25, and thus it is difficult to determine how long the clock has been disabled.

In this regard, the gateway 100 of the disclosure estimates a time of occurrence of a security event by preparing time history data according to periods of a milestone time value ($\Delta T_{milestone}$) even when the clock is enabled. In detail, when the milestone time value is 72 hours, it may be estimated that a timepoint t23 (a timepoint when a battery is removed) is present between 216 hours to 288 hours from the timepoint t22 if three milestone flags 144 are stored after the timepoint t22.

Similarly, three or more and four or less milestone flags 145 are stored between the timepoint t24 and the timepoint t25, and thus a time interval between the timepoint t24 and the timepoint t25 is 216 hours to 288 hours. Also, two or more and three or less milestone flags 145 are stored between the timepoint t25 and the timepoint t26, and thus a time interval between the timepoint t25 and the timepoint t26 is 144 hours to 216 hours. In other words, even if not completely accurate, a time of occurrence of a security event may be schematically estimated by using a milestone flag.

Figure 9:
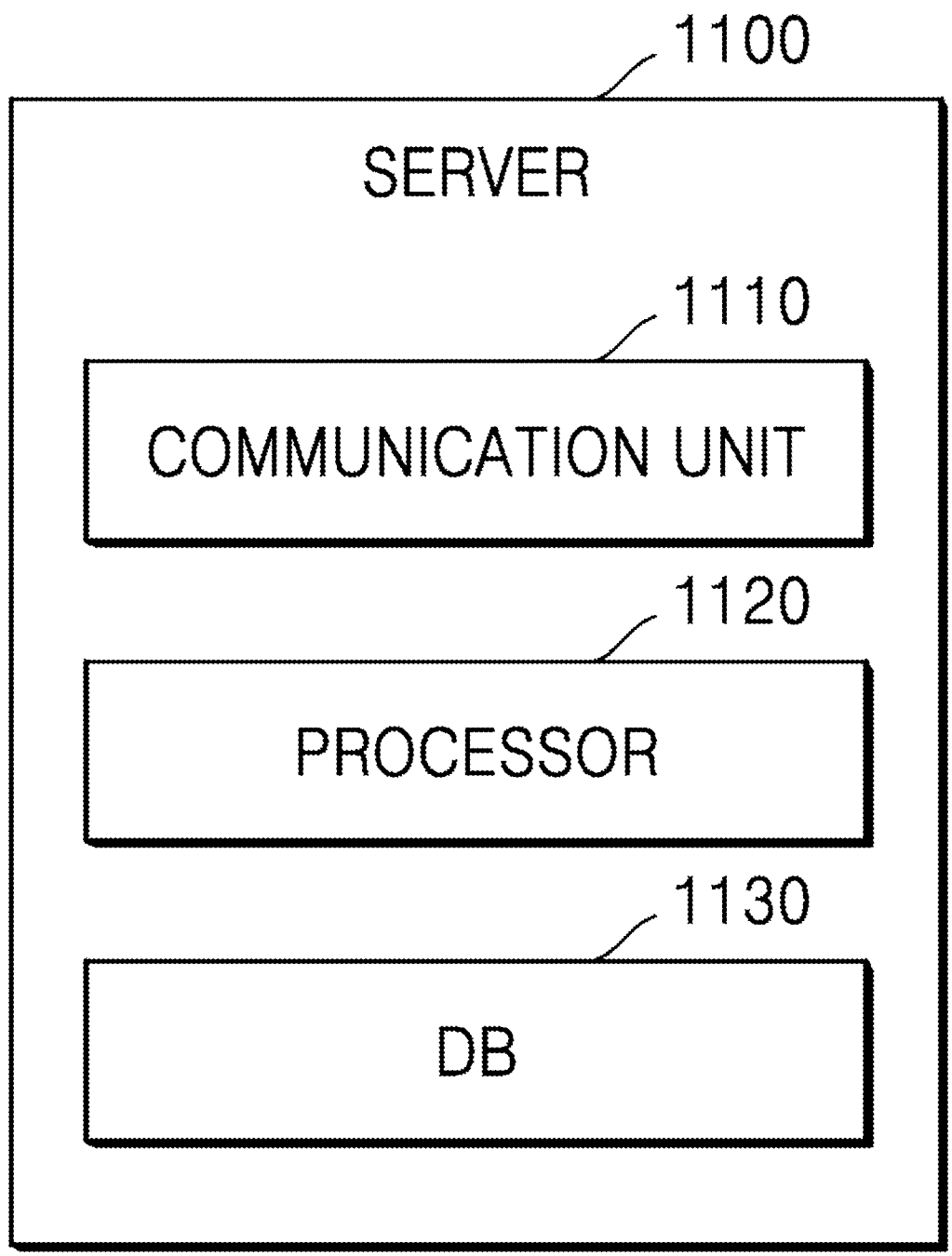
FIG. 9 is a block diagram of a server according to an embodiment.

FIG. 9 is a block diagram of a server 1100 according to an embodiment.

The server 1100 of FIG. 9 may be the diagnosis server 300 of FIG. 1.

Referring to FIG. 9, the server 1100 may include a communication unit 1110, a processor 1120, and a database (DB) 1130. Only components related to an embodiment are illustrated for the server 1100 in FIG. 9. Accordingly, it would be understood by one of ordinary skill in the art that general-purpose components other than those shown in FIG. 9 may be further included.

The communication unit 1110 may include one or more components enabling wired/wireless communication with other nodes. For example, the communication unit 1110 may include a short-range communication unit (not shown), a mobile communication unit (not shown), and a broadcast receiver (not shown).

The DB 1130 is hardware storing various types of data processed in the server 1100, and may store programs for processing and control by the processor 1120. The DB 1130 may store payment information, user information, and the like.

The DB 1130 may include a random access memory (RAM) such as a dynamic random access memory (DRAM) or a static random access memory (SRAM), a read-only memory (ROM), an electrically erasable programmable read-only memory (EEPROM), CD-ROM, Blu-ray or another optical disk storage, a hard disk drive (HDD), a solid state drive (SSD), or a flash memory.

The processor 1120 controls overall operations of the server 1100. For example, the processor 1120 may execute the programs stored in the DB 1130 to control, in overall, an input unit (not shown), a display (not shown), the communication unit 1110, and the DB 1130. The processor 1120 may execute the programs stored in the DB 1130 to control operations of the server 1100. The processor 1120 may control at least some of operations of the components described in FIGS. 1 through 8.

The processor 1120 may be implemented by using at least one of an application-specific integrated circuit (ASIC), a digital signal processor (DSP), a digital signal processing device (DSPD), a programmable logic device (PLD), a field programmable gate array (PFGA), a controller, a microcontroller, a microprocessor, and an electric unit for performing another function.

The embodiments according to the disclosure may be implemented in a form of a computer program executable by various components on a computer, and such a computer program may be recorded in a computer-readable medium. Here, the computer-readable medium may include hardware devices specially designed to store and execute program instructions, such as magnetic media, such as a hard disk, a floppy disk, and a magnetic tape, optical recording media, such as CD-ROM and DVD, magneto-optical media such as a floptical disk, and read-only memory (ROM), random-access memory (RAM), and a flash memory.

The computer program may be specially designed for the disclosure or well known to one of ordinary skill in the computer software field. Examples of the computer program include not only machine codes generated by a compiler, but also high-level language codes executable by a computer by using an interpreter or the like.

According to an embodiment, a method according to various embodiments of the disclosure may be provided by being included in a computer program product. The computer program products are products that can be traded between sellers and buyers. The computer program product may be distributed in a form of machine-readable storage medium (for example, a compact disc read-only memory (CD-ROM)), or distributed through an application store (for example, Play Store™) or directly or online between two user devices (for example, download or upload). In the case of online distribution, at least a part of the computer program product may be at least temporarily stored or temporarily generated in the machine-readable storage medium such as a server of a manufacturer, a server of an application store, or a memory of a relay server.

According to an embodiment of the disclosure, it is possible to estimate a time of occurrence of a security event.

In addition, a clock inside a vehicle operating according to constant power supply and an actual time of the reality may be matched to each other.

Moreover, the time of occurrence of the security event may be estimated even when the clock inside the vehicle is disabled due to battery removal.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A method of estimating a time of occurrence of a security event, the method comprising:
transmitting an actual time to a gateway of a vehicle;
obtaining, from the gateway, time history data storing an actual time flag data element;
obtaining, from the gateway, logging data prepared during security event detection; and
estimating a time of occurrence of a security event, based on the logging data and the time history data,
wherein the time history data and the logging data are prepared based on a vehicle reference time including a timestamp value and a reset counter value of the vehicle, and
wherein the gateway identifies a clock state of the vehicle during booting, and when the clock state of the vehicle is a disabled state, the gateway writes a data element of a reset flag on the time history data and then changes the clock state of the vehicle to an enabled state.

2. The method of claim 1, wherein the timestamp value is generated by a clock that is operated by constant power supply of the vehicle.

3. The method of claim 1, wherein the gateway identifies the clock state of the vehicle during the booting, and when the clock state of the vehicle is the enabled state, the gateway writes a milestone flag data element on the time history data when a difference between a current timestamp value and a most recent timestamp value of the time history data exceeds a pre-set milestone time value.

4. The method of claim 3, wherein the estimating of the time of the occurrence of the security event comprises, when a reset counter value of the actual time flag data element of the time history data and a reset counter value of the logging data are different from each other, estimating the time of the occurrence of the security event, based on the milestone time value.

5. A non-transitory computer-readable recording medium having recorded thereon a program for executing the method of claim 1 on a computer.

6. A system for estimating a time of occurrence of a security event, the system comprising:
a security gateway configured to determine a vehicle reference time including a timestamp value and a reset counter value of a vehicle, and prepare time history data and logging data based on the vehicle reference time; and
a server configured to transmit an actual time to the security gateway, obtain, from the security gateway, the time history data storing an actual time flag data element based on the actual time, obtain, from the security gateway, the logging data prepared during security event detection, and estimate the time of the occurrence of the security event, based on the logging data and the time history data,
wherein the security gateway identifies a clock state of the vehicle during booting, and when the clock state of the vehicle is a disabled state, the security gateway writes a data element of a reset flag on the time history data and then changes the clock state to an enabled state.

\* \* \* \* \*